United States Patent
Boffa et al.

(10) Patent No.: US 11,346,792 B2
(45) Date of Patent: *May 31, 2022

(54) METHOD AND APPARATUS FOR CHECKING TYRES IN A PROCESS AND A PLANT FOR MAKING TYRES FOR VEHICLE WHEELS

(71) Applicant: PIRELLI TYRE S.P.A., Milan (IT)

(72) Inventors: Vincenzo Boffa, Milan (IT); Alessandro Held, Milan (IT); Fabio Regoli, Milan (IT)

(73) Assignee: PIRELLI TYRE S.P.A., Milan (IT)

( * ) Notice: Subject to any disclaimer, the term of this patent is extended or adjusted under 35 U.S.C. 154(b) by 0 days.

This patent is subject to a terminal disclaimer.

(21) Appl. No.: 16/772,116

(22) PCT Filed: Dec. 19, 2018

(86) PCT No.: PCT/IB2018/060361
§ 371 (c)(1),
(2) Date: Jun. 11, 2020

(87) PCT Pub. No.: WO2019/123327
PCT Pub. Date: Jun. 27, 2019

(65) Prior Publication Data
US 2020/0400590 A1    Dec. 24, 2020

(30) Foreign Application Priority Data
Dec. 20, 2017   (IT) .................. 102017000147532

(51) Int. Cl.
*G01B 11/24*   (2006.01)
*G01N 21/95*   (2006.01)
(Continued)

(52) U.S. Cl.
CPC ...... *G01N 21/9515* (2013.01); *G01M 17/027* (2013.01); *G01N 21/8851* (2013.01); *H04N 13/156* (2018.05); *H04N 13/296* (2018.05)

(58) Field of Classification Search
CPC .......... G01N 21/9515; G01N 21/8851; G01M 17/027; H04N 13/156; H04N 13/296; B29D 2030/0027; B29D 2030/0066
See application file for complete search history.

(56) References Cited

U.S. PATENT DOCUMENTS 10,451,527 B2 * 10/2019 Boffa .................. G01M 17/021
10,458,883 B2 * 10/2019 Boffa .................. G01M 17/022
10,900,774 B2 *  1/2021 Boffa .................. G01M 17/027

FOREIGN PATENT DOCUMENTS

EP      1826529 A1    8/2007
WO   2016/088040 A2    6/2016
(Continued)

OTHER PUBLICATIONS

International Search Report for International Application No. PCT/IB2018/060361 filed on Dec. 19, 2018 on behalf of Pirelli Tyre SPA. dated Mar. 25, 2019. 4 pages.
(Continued)

*Primary Examiner* — Howard D Brown, Jr.
(74) *Attorney, Agent, or Firm* — Steinfl + Bruno, LLP

(57) ABSTRACT

An apparatus for checking tyres has at least one check unit at least two consecutively placed check stations defining a check path such that each check station is traversed in one cycle time and by pitches by each tyre to be checked. Each check station includes: a support device for one tyre at a time housed in the respective check station, high-definition image acquisition systems of a surface of the tyre, and movement devices. The high-definition image acquisition systems have systems for acquiring high-definition two-dimensional and three-dimensional images. Only one of the at least two check
(Continued)

stations has all the high-definition three-dimensional image acquisition systems of the check unit.

22 Claims, 7 Drawing Sheets

(51) Int. Cl.
*H04N 13/156* (2018.01)
*H04N 13/296* (2018.01)
*G01M 17/02* (2006.01)
*G01N 21/88* (2006.01)

(56) References Cited

FOREIGN PATENT DOCUMENTS

| WO | 2017/085651 | A1 | 5/2017 |
| WO | 2017/199173 | A9 | 11/2017 |
| WO | 2017/208093 | A1 | 12/2017 |

OTHER PUBLICATIONS

Written Opinion for International Application No. PCT/IB2018/060361 filed on Dec. 19, 2018 on behalf of Pirelli Tyre SPA. dated Mar. 25, 2019. 6 pages.

Chinese Office Action for CN Application No. 201880082423.9 filed on Dec. 19, 2018 on behalf of Pirelli Tyre S.P.A. dated Jan. 21, 2022 26 pages (English+ Original).

* cited by examiner

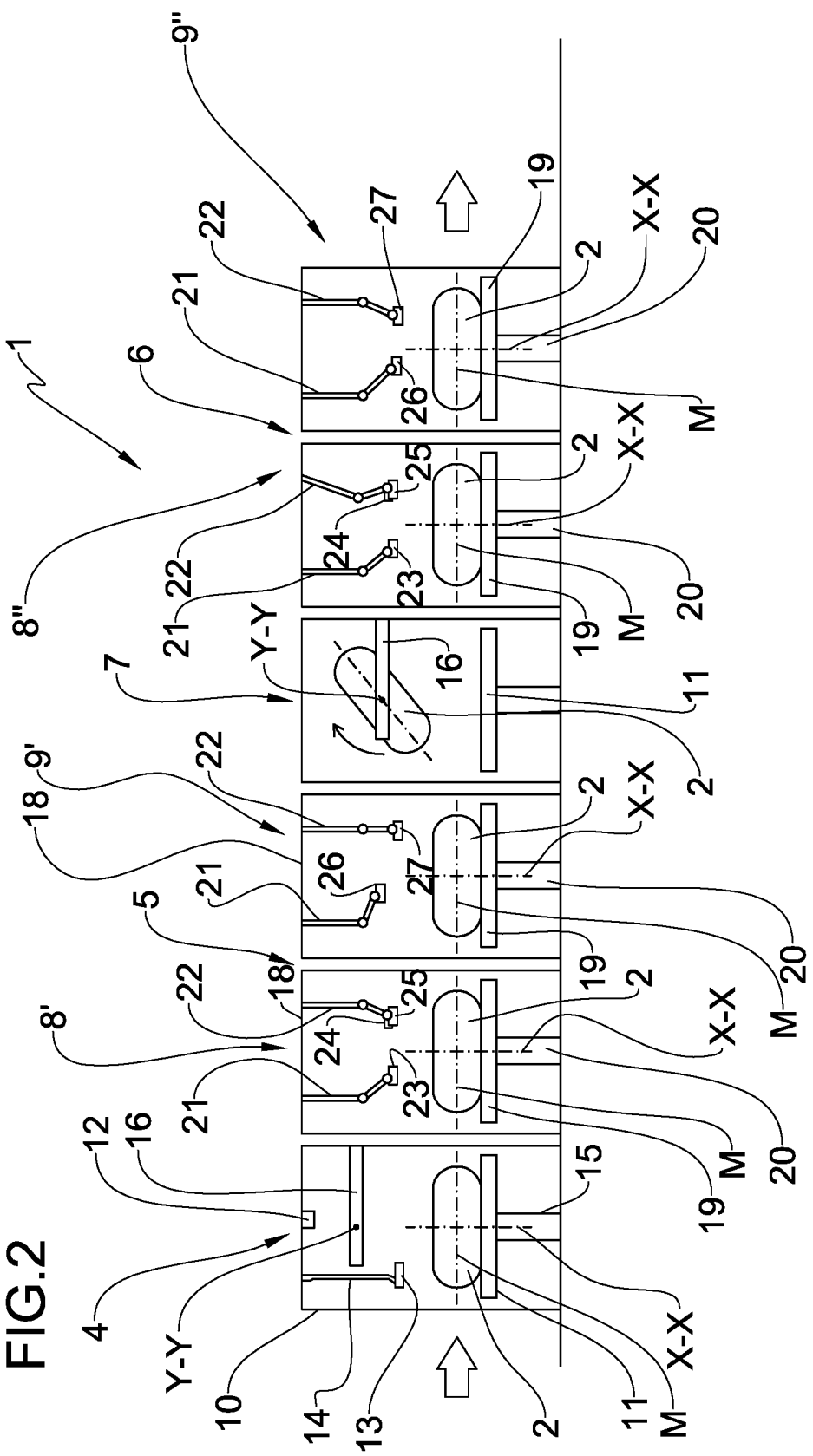

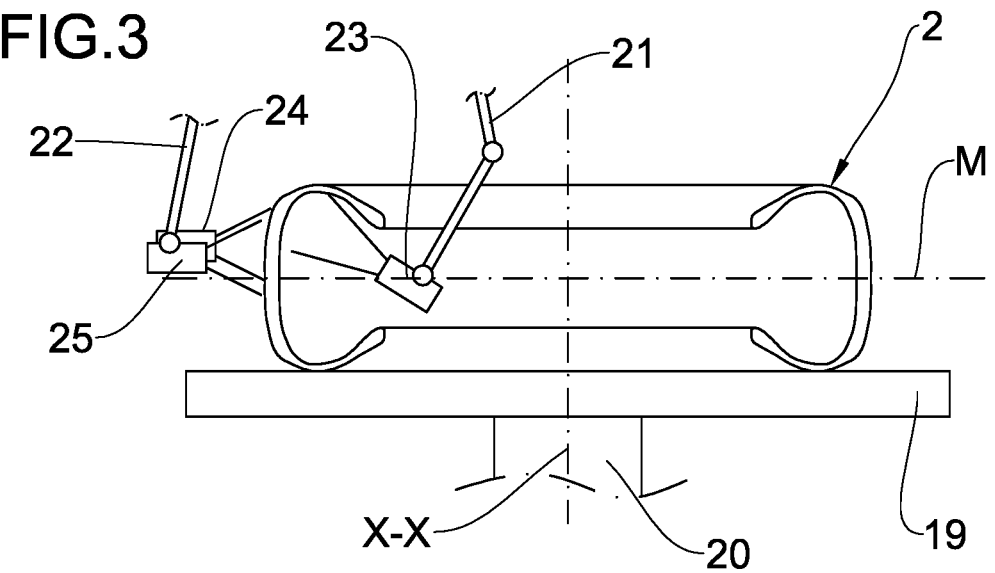
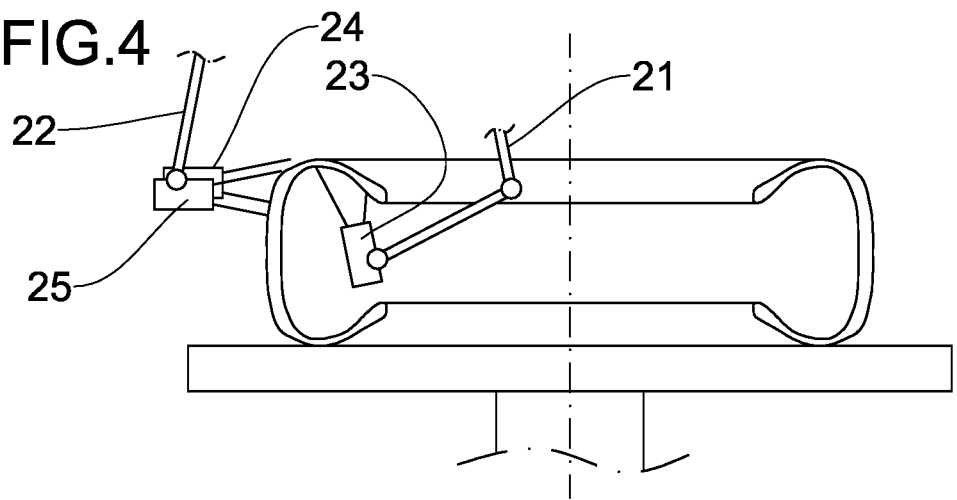
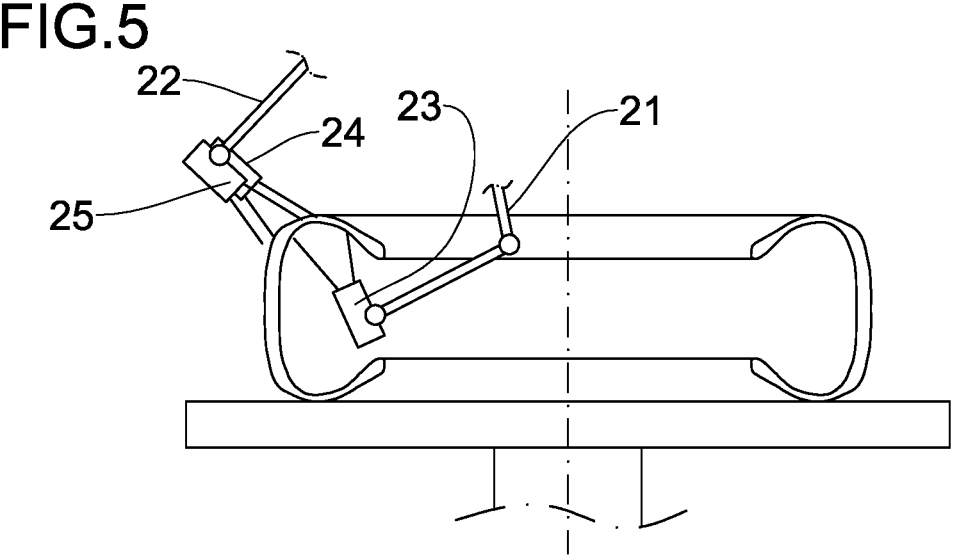

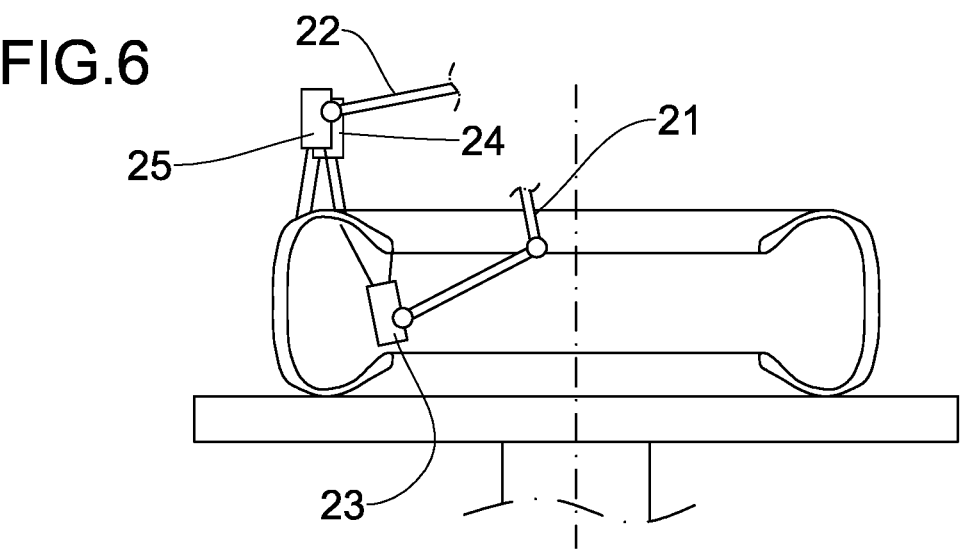
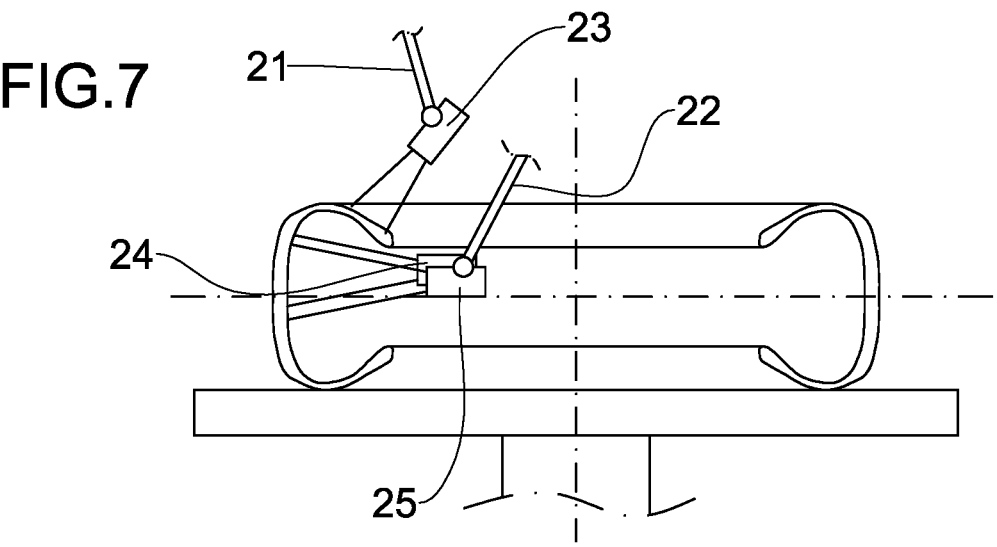
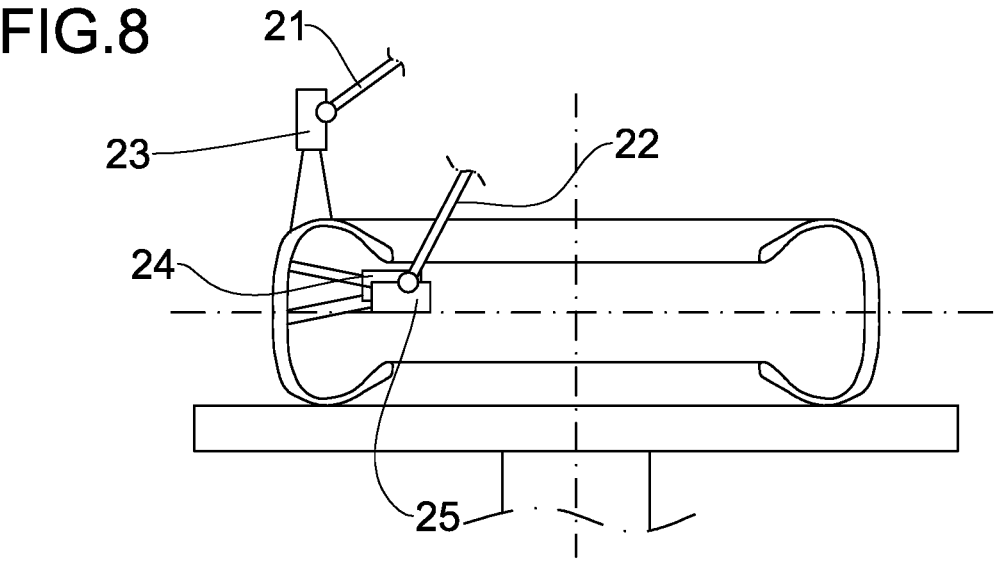

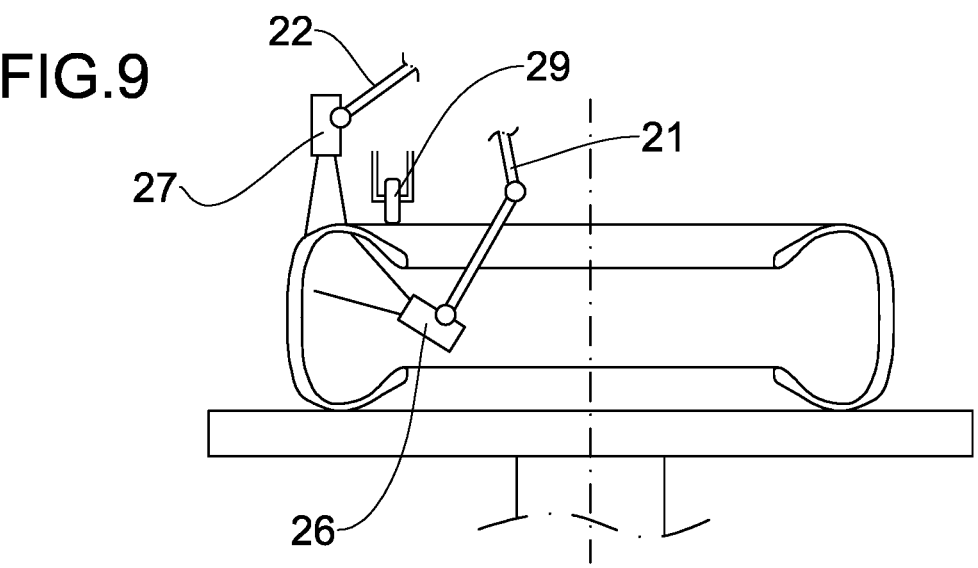
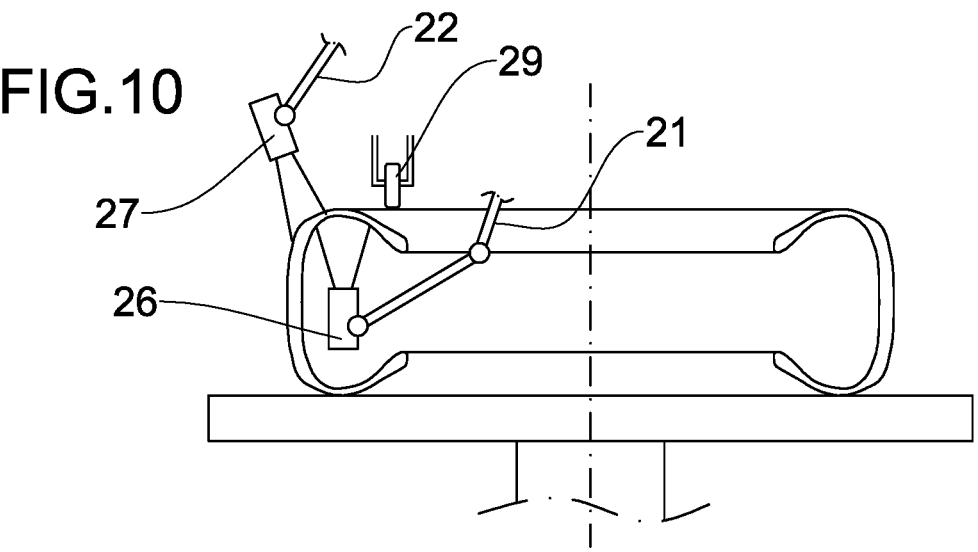
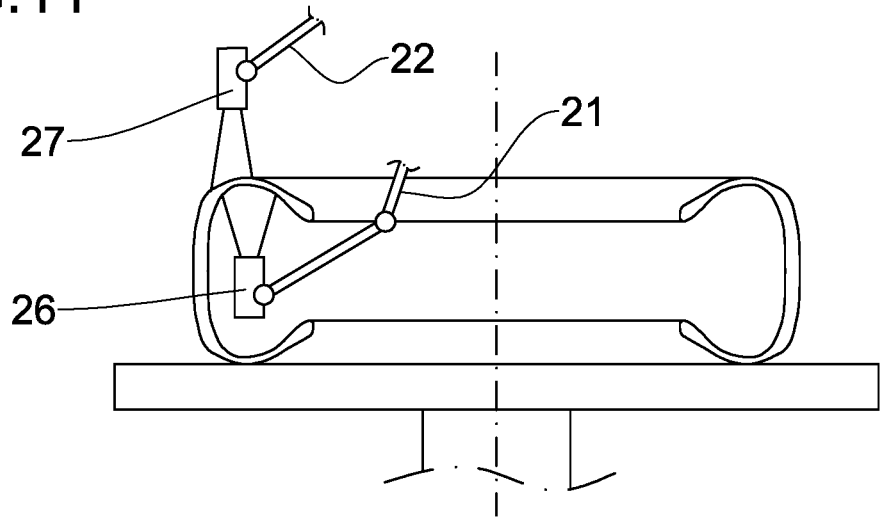

METHOD AND APPARATUS FOR CHECKING TYRES IN A PROCESS AND A PLANT FOR MAKING TYRES FOR VEHICLE WHEELS

CROSS-REFERENCE TO RELATED APPLICATIONS

The present application is the U.S. National Stage of International Patent Application No. PCT/IB2018/060361 filed on Dec. 19, 2018 which, in turn, claims priority to Italian Patent Application No. IT 102017000147532 filed on Dec. 20, 2017.

TECHNICAL FIELD OF THE INVENTION

The present invention relates to a method and an apparatus for checking tyres, in a process and a plant for making tyres for vehicle wheels.

In particular, the present invention falls within the scope of quality checks carried out on preferably moulded and vulcanised tyres, adapted to verify the compliance thereof with the project specifications and therefore allow, for example, the compliant ones to be sent to storage and the defective ones to be discarded.

A tyre for vehicle wheels generally comprises a carcass structure comprising at least one carcass ply having axially opposite end flaps engaged with respective annular anchoring structures integrated in the areas usually identified by the name of "beads". The carcass structure is associated with a belt structure comprising one or more belt layers placed in radial superposition with respect to one another and with respect to the carcass ply. A tread band is applied in a position radially outer to the belt structure, made of elastomeric material like other semi-finished products making up the tyre. Respective sidewalls of elastomeric material are further applied in an axially outer position on the lateral surfaces of the carcass structure, each extending from one of the lateral edges of the tread band up at the respective annular anchoring structure to the beads.

After the building of the green tyre carried out by assembling respective semi-finished products, the production cycle ends by executing a moulding and vulcanisation treatment in order to determine the structural stabilisation of the tyre through cross-linking of the elastomeric material, as well as at a desired tread pattern on the tread band and to impart any distinguishing graphic signs at the sidewalls. Preferably after vulcanisation, the tyres are subjected to quality checks in order to check for any defects.

Definitions

The term "elastomeric material" is to designate a composition comprising at least one elastomeric polymer and at least one reinforcement filler. Preferably, such a composition further comprises additives such as cross-linking agents and/or plasticisers. Due to the presence of the cross-linking agents, such a material can be cross-linked by heating so as to form the final manufactured article.

The terms "lower", "higher", "low", "high", "below" and "above" identify the relative position of an element, such as a component of a tyre, a tyre, an apparatus, a device, etc., with respect to the ground or of one of said elements with respect to another element.

The term "axial halves of the tyre" means the halves delimited by an axial middle line/symmetry plane orthogonal to the main rotation axis of the tyre and equidistant from the beads of the tyre itself.

"At least one axial half of the tyre" means a complete half as defined above plus, possibly, a further portion of the other half extending axially starting from the aforementioned middle line/symmetry plane.

By "simultaneous advancement and by pitches of the tyres" it is meant the simultaneous displacement of a plurality of tyres placed in series along a path, preferably by a constant pitch, wherein said simultaneous displacements are interspersed with substantially constant time intervals, preferably corresponding to a cycle time.

"Cycle time" (CT) means a time interval elapsing between the outlet of a tyre to be checked from a check station and the outlet of the next tyre. This time interval preferably corresponds to the time elapsed between successive movement steps of each tyre to be checked.

By "acquisition time" (or slot) it is meant the time in which one or more images (views) of respective circumferential portions of the tyre surface are acquired, preferably corresponding to the execution time of a complete rotation of the tyre about its rotation axis. In a cycle time (CT) there are more subsequent acquisition times (slots) interspersed with times of movement and repositioning of image acquisition systems. By "image", or equivalently "digital image", it is generally meant a set of data, typically contained in a computer file, in which each coordinate (typically two-dimensional) of a finite set (typically two-dimensional and matrix, i.e. N rows×M columns) of spatial coordinates (each typically corresponding to a pixel) is associated with a corresponding set of numerical values (which may be representative of different magnitudes). For example, in monochromatic images (such as those with grey levels or "greyscale"), this set of values coincides with a single value in a finite scale (typically at 256 levels or tones), this value being representative of the brightness (or intensity) level, for example, of the respective spatial coordinate when displayed, while in colour images the set of values represents the brightness level of a multiplicity of colours, or channels, typically the fundamental colours (for example in the RGB coding red, green and blue, while in the CMYK coding cyan, magenta, yellow and black). The term "image" does not necessarily imply the actual display of the same.

Any reference to a specific "digital image" (for example, a two-dimensional digital image initially acquired on the tyre) includes more generally any digital image obtainable through one or more digital processing of said specific digital image (such as, for example, filtering, equalization, "thresholds", morphological transformations—"opening", etc.,—gradient calculations, smoothing, etc.).

The term "two-dimensional image" or "2D" means a digital image each pixel of which is associated to information representative of the reflectivity/diffusivity and/or colour of the surface, such as the images detected from the common cameras or digital cameras (e.g. CCD).

The term "three-dimensional image" or "3D" means a digital image each pixel of which is associated to surface height information, for example the images obtained by the altimetric profile reconstruction technique of a surface through a triangulation processing of a two-dimensional matrix image of the surface illuminated by a laser light line.

By "high definition image" it is meant an image having a definition in every spatial direction relative to the image itself (for example of a Cartesian triad for 3D images) less than or equal to 0.05 mm, preferably less than or equal to 0.01 mm.

By "low definition image" it is meant an image having a definition in each spatial direction relative to the image itself (for example of a Cartesian triad for 3D images) greater than 0.05 mm, preferably greater than or equal to 0.1 mm, more preferably comprised between about 0.3 mm and about 5 mm.

By "view" it is meant the two-dimensional or three-dimensional image (2D or 3D) of a respective circumferential portion of the surface of the tyre acquired during a complete rotation of the tyre about its rotation axis. During an acquisition time, multiple views are acquired simultaneously.

By the term "check" referring to tyres we generally mean all those non-destructive operations that allow detecting any external (on radially outer and/or radially inner surfaces) and/or internal (within the structure) defects of the tyre. Said checks may, for example, be of the optical type, ultrasound or mechanical or a combination thereof. Preferably, the optical checks provide for the acquisition of two-dimensional and three-dimensional digital images.

Prior Art

Document WO2016/088040, on behalf of the same Applicant, illustrates an apparatus and a method for checking tyres. The apparatus comprises a first check unit having an inlet and comprising a plurality of checking tools; a second check unit having an outlet and comprising a plurality of checking tools; an overturning and transport device operatively interposed between the first check unit and the second check unit. The first check unit, the second check unit and the overturning and transport device define a check path configured so as to be traversed by pitches by each tyre. The first check unit and the second check unit comprise the same checking tools configured for performing the same checks on respective axial halves of the tyres. The overturning and transport device is configured for overturning the tyre around an overturning axis perpendicular to a main rotation axis of the tyre and belonging to an axial middle line plane thereof.

SUMMARY

In the field of automated systems for tyre inspection, such as the one described above, the Applicant has observed that the quality and accuracy of the optical checks carried out by the acquisition of digital images can be improved in order to contribute to the production of tyres characterised by ever higher standards.

In particular, the Applicant has found that the major problems are related to the recognition of three-dimensional defects (such as bubbles, burrs or similar deformations in relief with respect to a tyre surface), since the three-dimensional digital reconstruction of the complete image of the tyre obtained by known methods is complex and can lead to inaccurate results.

The Applicant has in particular verified that if the acquisition systems, in particular those configured for acquiring three-dimensional high-definition images, are physically located in different check stations, their calibration is difficult and/or the combination of the images acquired by each for reconstructing the three-dimensional image of at least one axial half of the tyre is complex and requires complex algorithms.

The Applicant has therefore perceived that it is possible to make the recognition of defects more effective and precise, by executing three-dimensional optical scanning of all views of at least one axial half of the tyre (which are subsequently analysed by algorithms) in a single reference system, i.e. in an acquisition station in which all three-dimensional high-definition image acquisition systems of said at least one axial half of the tyre are installed.

More specifically, according to one aspect thereof, the present invention relates to a method for checking tyres, each tyre having an axial middle line plane defining respective axial halves of said tyre.

Preferably, it is provided to simultaneously advance, by pitches, the tyres along a check path and acquiring high-definition images of a surface of every tyre in a time corresponding to at least two times a cycle time between successive pitches and in respective at least two check stations.

Preferably, acquiring high-definition images comprises acquiring a plurality of high-definition three-dimensional images and a plurality of high-definition two-dimensional images of the surface of the tyre.

Preferably, acquiring high-definition images comprises combining together at least the high-definition three-dimensional images acquired in order to obtain at least one axial half of a complete three-dimensional image of said surface of the tyre.

Preferably, it is provided to acquire the high-definition three-dimensional images during a single cycle time in a single check station.

According to a different aspect, the present invention relates to an apparatus for checking tyres, comprising at least one check unit.

Preferably, the check unit comprises at least two check stations placed consecutively and defining a check path configured such that each check station is traversed in one cycle time and by pitches by each tyre to be checked.

Preferably, each of the at least two check stations comprises a support device for one tyre at a time housed in the respective check station.

Preferably, each of the at least two check stations comprises a plurality of high-definition image acquisition systems of a tyre surface.

Preferably, each of the at least two check stations comprises movement devices for moving the high-definition image acquisition systems within the respective check station.

Preferably, the plurality of high-definition image acquisition systems comprises systems for acquiring high-definition three-dimensional images and systems for acquiring high-definition two-dimensional images.

Preferably, only one of said at least two check stations comprises all the high-definition three-dimensional image acquisition systems of the check unit.

The Applicant believes that the apparatus and the method for checking tyres according to the invention allow a more accurate check of the tyres to be executed and to highlight with greater accuracy and certainty the possible presence of defects, even of the smallest ones.

The Applicant has in fact verified that the invention allows obtaining a complete high-definition three-dimensional image of both at least the axial halves of the tyre with extreme accuracy, through the correct, simple and precise concatenation, via software, of all the three-dimensional images acquired along the circumference of the tyre.

The Applicant has verified that the concatenation is simple and precise due to the fact that all three-dimensional high-definition images are acquired in a single check station and therefore with a single physical reference system common to all three-dimensional image acquisition systems.

The Applicant has verified that this concatenation and the consequent obtaining of a digital image of at least each axial half of the tyre is possible by adopting relatively simple and therefore cost-effective algorithms, which are easy to manage and also less fallible.

The Applicant has also verified that the invention allows implementing checks with a high capacity for fault detection and high reliability without losing checking time and check space. These aspects have a positive effect on the quality of the tyres produced and declared as compliant.

The present invention, in at least one of the above aspects thereof, can exhibit one or more of the following preferred features.

Preferably, acquiring high-definition images comprises combining together at least the high-definition two-dimensional images acquired in order to obtain at least one axial half of a two-dimensional image of said surface of the tyre.

Preferably, it is provided to acquire low-definition images of the surface of every tyre in a single preliminary check station and prior to acquiring the high-definition images.

Preferably, a preliminary check station is located upstream of said at least one check unit.

Preferably, said preliminary check station comprises a support device for one tyre at a time housed in the preliminary check station.

Preferably, the preliminary check station comprises a plurality of low-definition image acquisition systems of a tyre surface.

Preferably, said preliminary check station comprises a bar code and/or QR code reader in order to identify the incoming tyre and to know the overall dimensions thereof in order to compare them with the measurements carried out in the preliminary check station.

Preferably, the preliminary check station comprises movement devices for moving the low-definition image acquisition systems within the respective preliminary check station.

The preliminary check station allows checking the shape and dimensions of the tyre before the tyre enters the subsequent high-definition check stations, in particular to ensure correct positioning of the high-definition acquisition systems and above all to avoid interferences between these systems and the tyre to be checked. The preliminary check station also allows identifying tyres with macro-defects (such as internal and/or external bubbles and/or detachments generated during vulcanisation) and avoiding them, if such macro-defects are present, from being subjected to subsequent high-definition checks and high-definition image processing to avoid damage to the aforementioned high-definition image acquisition systems.

Preferably, it is provided to acquire low-definition images during a single cycle time.

The preliminary check of each tyre is executed entirely in a single cycle time and in a single preliminary check station, while the subsequent high-definition checks are split among several check stations and multiple cycle times.

Preferably, it is provided to acquire high-definition images of a first axial half of the tyre in a first check path and subsequently to acquire high-definition images of a second axial half of the tyre in a second check path.

Preferably, it is provided to acquire the high-definition three-dimensional images of the first axial half during a single cycle time in a single check station of the first check path and it is provided to acquire the high-definition three-dimensional images of the second axial half during a single cycle time in a single check station of the second check path.

Preferably, between the acquisition of the high-definition images of the first axial half and the acquisition of the high-definition images of the second axial half, the tyre is overturned by 180°.

The high-definition checks executed separately first on one axial half of each tyre and then on the other axial half allow simplifying the structure of the check stations and the positioning of the acquisition systems, as these can be designed, placed and moved to approach the tyre substantially on one side only of the tyre itself.

Preferably, the first check path and the second check path physically coincide.

Preferably, after the acquisition of the high-definition images of the first axial half, the tyre travels over the same check path for the acquisition of the high-definition images of the second axial half.

Preferably, a single check unit and an overturning and transport device operatively interposed between an outlet of said single check unit and an inlet of said single check unit are provided.

Preferably, said overturning and transport device is configured for overturning the tyre around an overturning axis.

Preferably, the plurality of high-definition image acquisition systems of the individual check unit is configured for executing checks on one of the axial half of the tyre and for executing checks on the other of the axial half of the tyre once said tyre has been overturned by the overturning and transport device.

The configuration with a single check unit that is crossed twice by the tyres allows limiting the dimensions of the apparatus and facilitating, for example, the installation of the apparatus in the production sites, preferably downstream of the production lines.

Preferably, a first check unit and a second check unit are provided, operatively arranged one after the other.

Preferably, an overturning and transport device is operatively interposed between the first check unit and the second check unit.

Preferably, said overturning and transport device is configured for overturning the tyre around an overturning axis.

Preferably, the plurality of high-definition image acquisition systems of the first check unit is configured for executing checks on a first axial half of the tyre and the plurality of high-definition image acquisition systems of the second check unit is configured for executing checks on a second axial half of the tyre once said tyre has been overturned by the overturning and transport device.

The configuration with two check units placed in series one after the other allows reducing the cycle time (CT) of the check.

Preferably, in each cycle time (CT) and in each check station, acquiring high-definition images comprises: executing successive acquisitions.

Preferably, during each acquisition, multiple high-definition views corresponding to different portions of the tyre are simultaneously acquired.

Preferably, the successive acquisitions are comprised between four and eight, more preferably equal to six or seven.

Preferably, in the only cycle time (CT) and in the check station dedicated to the acquisition of three-dimensional high-definition images, the successive acquisitions are comprised between four and eight, more preferably equal to six or seven.

Preferably, during each acquisition, the acquired high-definition views are between two and four.

Preferably, during each acquisition, the acquired three-dimensional high-definition views are two or three.

Preferably, each of the at least two check stations comprises a support structure extending above the support device.

Preferably, the movement devices comprise robotic arms, preferably anthropomorphic, more preferably at least six axes, wherein said robotic arms carry high definition image acquisition systems.

Preferably, the robotic arms are hung to the support structure.

Preferably, the robotic arms are located above the support device.

Preferably, the support device of the check station comprises an actuator configured for rotating the tyre around the rotation axis thereof during the acquisition of the high-definition images of the surface of the tyre.

Preferably, the support device of the check stations comprises a rotary table.

Preferably, an electronic unit is provided, operatively connected to the check stations and configured for executing the following procedure.

Preferably, it is provided to position the high-definition image acquisition systems by means of the movement devices.

Preferably, it is provided to rotate the tyre housed in each check station by means of the actuator.

Preferably, it is provided to simultaneously acquire multiple high-definition views corresponding to different portions of the tyre by means of the high-definition image acquisition systems and while the tyre rotates.

Preferably, it is provided to reposition the high-definition image acquisition systems.

Preferably, it is provided to simultaneously acquire further high-definition views corresponding to different portions of the tyre while the tyre rotates.

Preferably, the electronic unit is configured for combining together at least the high-definition three-dimensional images acquired in only one of said at least two check stations in order to obtain at least one axial half of a complete three-dimensional image of said surface of the tyre.

Preferably, the electronic unit digitally processes high-definition three-dimensional images acquired through algorithms.

Preferably, it is provided to acquire the low-definition images of both the axial halves of every tyre in the single preliminary check station.

Preferably, between a first transition and a second transition in the same check path, it is provided to bypass the preliminary check station and/or to inhibit the acquisition of the low-definition images. The complete preliminary check has already been done before the first transition and it is not necessary to run it a second time.

Preferably, in the single preliminary check station provision is made for: acquiring the low-definition images of the first axial half, overturning the tyre by 180° and then acquiring the low-definition images of the second axial half.

Preferably, the preliminary check station comprises an overturning mechanism configured for overturning the tyre around an overturning axis and allow the acquisition of the low-definition images of the first axial half and the second axial half.

This configuration of the preliminary check station allows limiting the space dedicated to these preliminary checks.

Preferably, the preliminary check station comprises a support structure extending above the support device.

Preferably, the movement devices of the preliminary check station comprise at least one Cartesian manipulator, preferably with at least two axes, wherein said Cartesian manipulator carries at least part of the low-definition image acquisition systems.

Preferably, the Cartesian manipulator is hung to the support structure.

Preferably, the Cartesian manipulator is placed above the support device.

Preferably, the support device of the preliminary check station comprises an actuator configured for rotating the tyre around the rotation axis thereof during the acquisition of the low-definition images of the surface of the tyre.

Preferably, an electronic unit is operatively connected to the preliminary check station and is configured for executing the following procedure.

Preferably, it is provided to position the low-definition image acquisition systems by means of the movement devices.

Preferably, it is provided to rotate the tyre housed in the preliminary check station by means of the actuator.

Preferably, it is provided to simultaneously acquire multiple low-definition views corresponding to different portions of a first axial half of the tyre by means of the low-definition image acquisition systems and while the tyre rotates.

Preferably, it is provided to stop the rotation of the tyre.

Preferably, it is provided to overturn the tyre by means of the overturning mechanism.

Preferably, it is provided to reposition the low-definition image acquisition systems.

Preferably, it is provided to place the tyre in rotation again.

Preferably, it is provided to simultaneously acquire multiple low-definition views corresponding to different portions of a second axial half of the tyre by means of the low-definition image acquisition systems and while the tyre rotates.

Preferably, it is provided to combine the low-definition views in order to obtain a low-definition image of said at least first axial half and of said at least second axial half of the tyre.

Further features and advantages will become more apparent from the detailed description of a preferred but non-exclusive embodiment of a method and an apparatus for checking tyres in a process and a plant for building tyres for vehicle wheels according to the present invention.

DESCRIPTION OF THE FIGURES

Such description is given hereinafter with reference to the accompanying drawings, provided only for illustrative and, therefore, non-limiting purpose, in which:

FIG. 2 shows a lateral elevation view of the apparatus for checking tyres in FIG. 1;

FIGS. 3 to 8 show a tyre in a station of the apparatus in FIGS. 1 and 2 in respective operating conditions;

FIGS. 9 to 14 show a tyre in a different station of the apparatus in FIGS. 1 and 2 in respective operating conditions;

DETAILED DESCRIPTION

Figure 1:
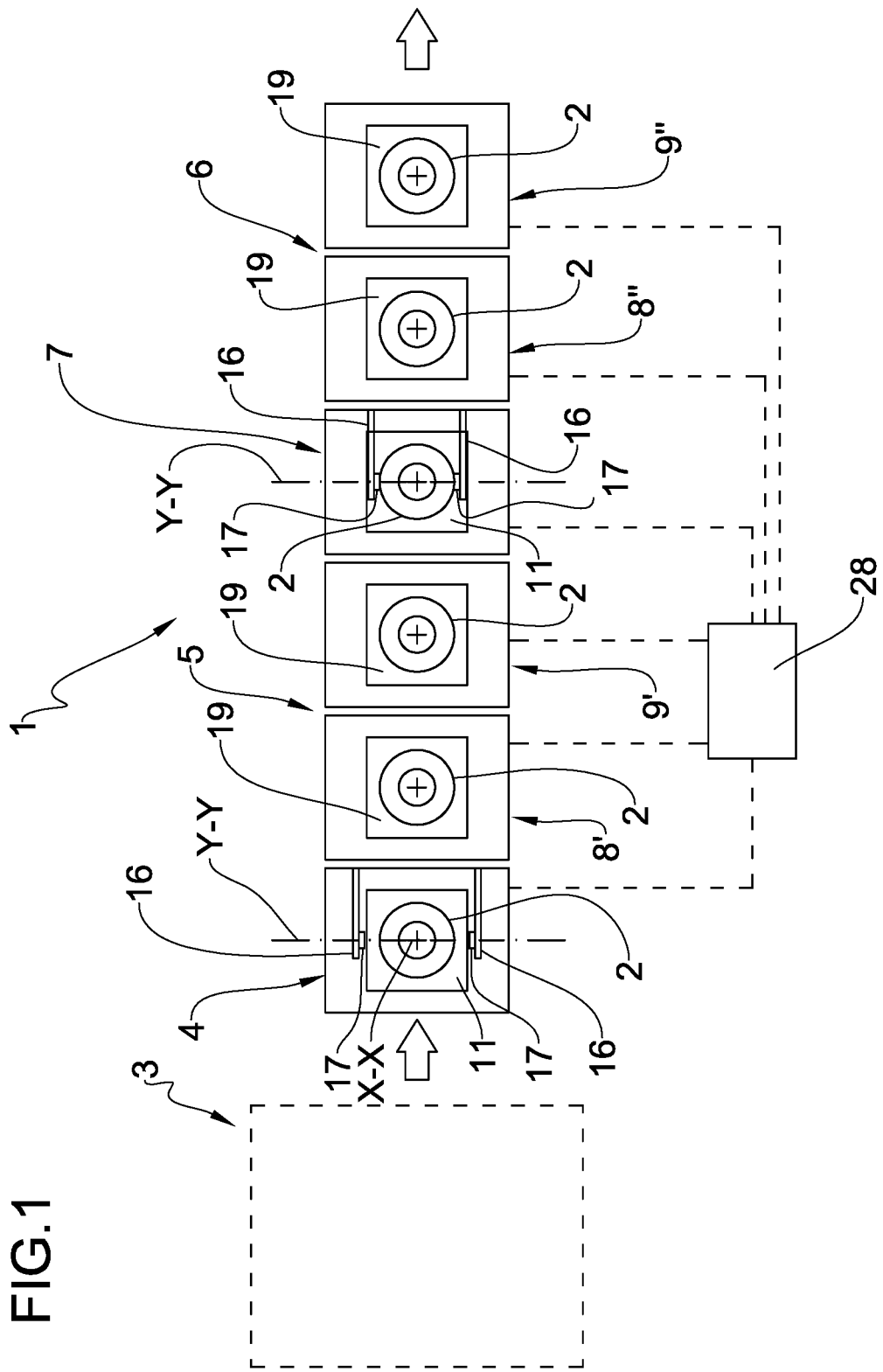
FIG. 1 schematically shows an apparatus for checking tyres associated with a plant for building tyres for vehicle wheels.
Figure 12:
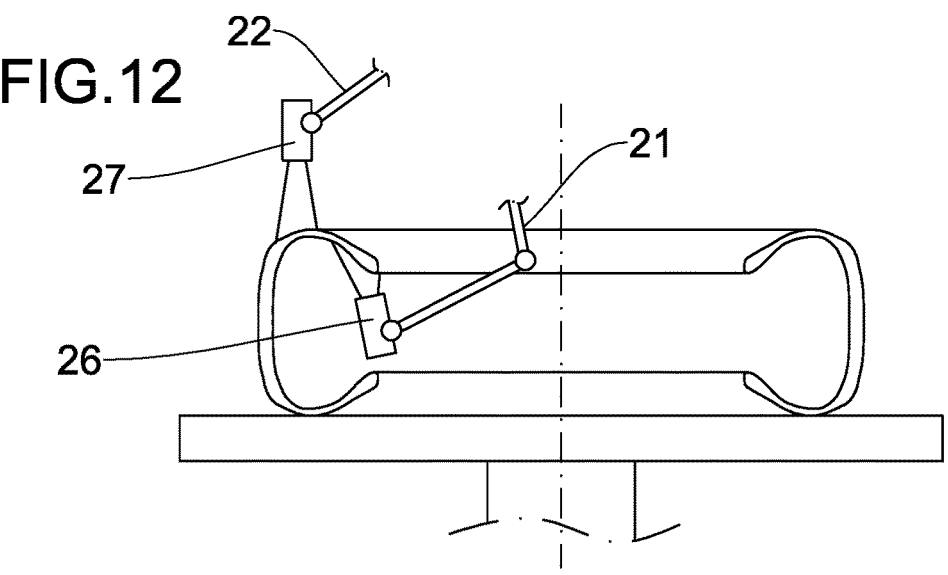
Figure 13:
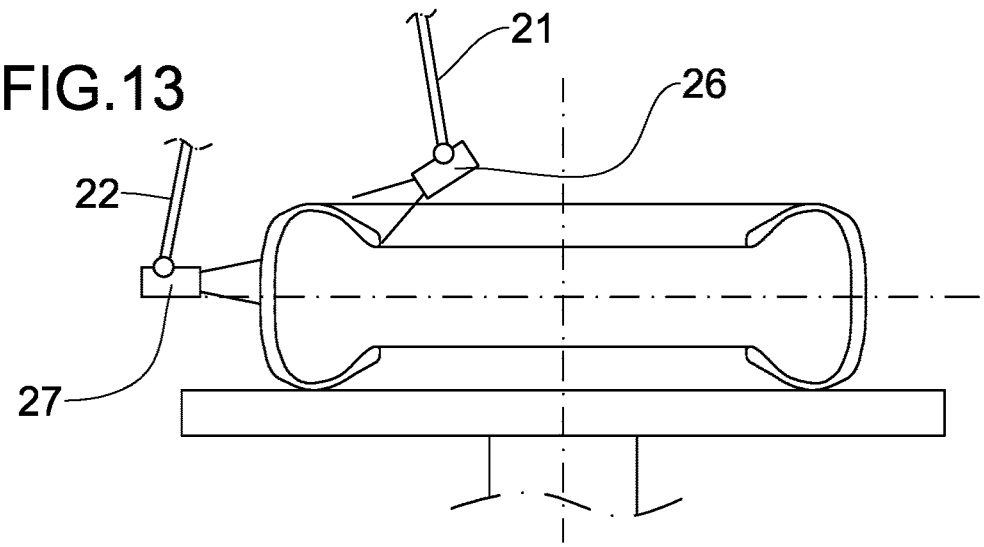
Figure 14:
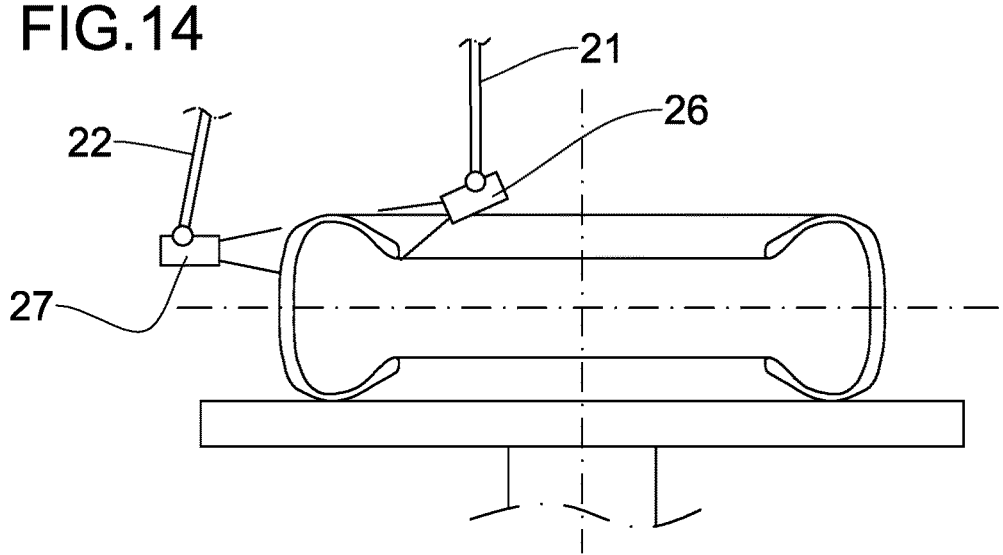

With reference to FIG. 1, reference numeral 1 globally indicates an apparatus for checking tyres 2. The apparatus 1 is preferably configured for executing a plurality of non-destructive tests on the tyres 2 coming from a plant for building tyres 3, illustrated only schematically.

The plant 3 comprises a production line of tyres consisting of a building apparatus of green tyres and at least one moulding and vulcanisation unit operatively arranged downstream of the building apparatus. In a non-limiting embodiment, the building apparatus comprises a carcass building line, at which forming drums are moved between different delivery stations of semi-finished products arranged to form a carcass sleeve on each forming drum. At the same time, in an outer sleeve building line, one or more auxiliary drums are sequentially moved between different stations arranged to form an outer sleeve on each auxiliary drum. The building apparatus further comprises an assembling station at which the outer sleeve is coupled to the carcass sleeve. In other embodiments of plant, the building apparatus may be of different type, for example designed to form all of the above components on a single drum.

The built tyres 2 are finally transferred to the moulding and vulcanisation unit. From the plant 3, in particular, from the moulding and vulcanisation unit, the finished tyres 2 exit sequentially one after the other with a predefined rate and a corresponding predefined production cycle time. The apparatus 1 for checking the tyres 2 is located immediately downstream of the plant 3 and is configured for executing non-destructive tests after the moulding and vulcanisation of said tyres 2.

The apparatus 1 for checking the tyres 2 comprises a preliminary check station 4 configured for executing a preliminary and low-definition check of a surface of each tyre 2.

The apparatus 1 for checking the tyres 2 further comprises a first check unit 5, a second check unit 6 operatively arranged one after the other and an overturning and transport device 7 operatively interposed between the first check unit 5 and the second check unit 6. The first check unit 5 defines a first check path and the second check unit 6 defines a second check path.

The preliminary check station 4, the first check unit 5, the second check unit 6 and the overturning and transport device 7 define a check path configured so as to be traversed by pitches by each tyre 2.

The preliminary check station 4 is configured for executing optical checks on each tyre 2 by the acquisition of low-definition digital images.

The first check unit 5 and the second check unit 6 each comprise a first check station 8', 8" and a second check station 9', 9" arranged for executing optical checks performed by acquiring high-definition digital images on each tyre 2.

The preliminary check station 4 comprises a support structure 10 consisting for example of a trellis frame comprising uprights connected by cross-members. The support structure 10 has a lower portion configured for resting on the ground and an upper portion. Within the support structure 10, a support device 11 is mounted, for example a motorised roller conveyor or table, which defines a horizontal abutment plane configured for supporting a tyre 2 resting on one of the sidewalls thereof. The support structure 10 extends above the support device 11. Between the upper portion of the support structure 10 and the support device 11, an operating space is defined that is configured for receiving, moving and checking one tyre 2 at a time. The preliminary check station 4 comprises a plurality of low-definition image acquisition systems configured for acquiring low-definition images of a surface of the tyre 2.

In the exemplary embodiment illustrated, the low-definition image acquisition systems comprise a fixed low-definition acquisition system 12 mounted on the upper portion of the support structure 10 and facing the support device 11. For example, the fixed acquisition system 12 comprises a camera and a laser light emitter configured for detecting low-definition 3D images of an outer surface of the tyre 2.

The low-definition image acquisition systems comprise a movable low-definition acquisition system 13 driven by respective movement devices 14. The movement devices 14 are configured for moving the movable acquisition system 13 into the operating space of the preliminary check station 4. In the illustrated embodiment, the movement devices 14 of the preliminary check station 4 comprise a Cartesian manipulator with at least two axes, hanging from the upper portion of the support structure 10 and thus placed above the support device 11. The Cartesian manipulator carries at a lower end thereof the movable low-definition acquisition system 13 comprising, for example, a camera and a laser light emitter configured for detecting low-definition 3D images. The movable low-definition acquisition system 13 is configured for detecting low-definition 3D images of an inner surface of the tyre 2, as will be further detailed below.

The support device 11 of the preliminary check station 4 comprises an actuator 15, schematically shown in FIG. 1, configured for rotating the tyre 2 around a rotation axis "X-X" thereof during the acquisition of the low-definition images by the low-definition image acquisition systems.

The preliminary check station 4 comprises an overturning mechanism configured for overturning the tyre 2 around an overturning axis "Y-Y" and allow the acquisition of the low-definition images of a first axial half and a second axial half of the tyre 2, wherein said axial halves of the tyre 2 are delimited by an axial middle line plane "M" of the tyre 2 itself.

The overturning mechanism, schematically illustrated in the accompanying figures, comprises a pair of arms 16 movable in mutual approach/distancing along a horizontal direction and movable together in a vertical direction, i.e. parallel to the rotation axis "X-X". The arms 16 are configured for grabbing, like a gripper, the tyre 2 engaging it at diametrically opposite portions of the tread band, lifting and overturning it by 180° around the overturning axis "Y-Y" orthogonal to the rotation axis "X-X". To this end, each of the arms 16 carries a motorised grip element 17, configured for engaging the tread band and rotate around the overturning axis "Y-Y".

The first check station 8' of the first check unit 5 comprises a support structure 18 similar to the support structure 10 of the preliminary check station 4. A support device 19, for example a motorised roller conveyor or table, is housed in the first check station 8' within the respective support structure 18 and is configured for supporting one tyre 2 at a time. The support device 19 defines a horizontal abutment plane configured for supporting a tyre 2 resting on one of its sidewalls, as in the preliminary check station 4. The support structure 18 extends above the support device 19. Between the upper portion of the support structure 18 and the support device 19, an operating space is delimited that is configured for receiving, moving and checking a tyre 2.

The first check station 8' of the first check unit 5 comprises a plurality of high-definition image acquisition systems configured for acquiring high-definition images of the surface of the tyre 2.

The first check station 8' of the first check unit 5 comprises an actuator 20 configured for rotating the support device 19 and the tyre 2 around the rotation axis "X-X" thereof during the acquisition of the high-definition images of the surface of the tyre 2.

With respect to the preliminary check station 4, the first check station 8' of the first check unit 5 is instead not preferably provided with an overturning mechanism.

Movement devices are installed on the support structure 18 for moving the high-definition image acquisition systems within the operating space of the first check station 8'. In the illustrated embodiment, the movement devices are a first robotic arm 21 and a second robotic arm 22, for example anthropomorphic, more preferably at least six axes, hanging from the upper portion of the support structure 18 and placed above the support device 19.

The first robotic arm 21 and the second robotic arm 22 carry the high-definition image acquisition systems at terminal ends thereof. In particular, the first robotic arm 21 and the second robotic arm 22 of the first check station 8' carry all the high-definition three-dimensional (3D) image acquisition systems of the first check unit 5 and one or more acquisition systems of two-dimensional (2D) high-definition images of the first check unit 5.

For example, the first robotic arm 21 carries a first high-definition 3D image acquisition system 23 (3D) provided with a camera and an emitter configured for generating a line or a beam of laser light forming a non-zero angle with an optical axis of the camera.

The second robotic arm 22 carries a second acquisition system 24 of high-definition three-dimensional (3D) images and a third acquisition system 25 of two-dimensional (2D) high-definition images (schematically represented in FIG. 2). The second acquisition system 24 comprises a camera and an emitter configured for generating a line or a laser light beam forming a non-zero angle with an optical axis of the camera. The third acquisition system 25 comprises a camera and one or more LED light sources configured for generating diffused and/or grazing light.

The second check station 9' of the first check unit 5 is structurally similar or identical to the first check station 8' except for the type of high-definition acquisition systems. In FIGS. 1 and 2, therefore, the same reference numerals have been adopted for the corresponding elements of the first and second check station 8', 9', namely: the support structure 18, the support device 19, the actuator 20, the first robotic arm 21, the second robotic arm 22.

The first robotic arm 21 of the second check station 9' carries a fourth acquisition system 26 of two-dimensional (2D) high-definition images provided with a camera and one or more LED light sources configured for generating diffused and/or grazing light. The second robotic arm 22 carries a fifth acquisition system 27 of two-dimensional (2D) high-definition images provided with a camera and one or more LED light sources configured for generating diffused and/or grazing light.

In the second check station 9' of said first check unit 5 a pressure element (not shown) is also installed, for example a roller or a wheel, driven by an electric, pneumatic or hydraulic actuator, connected to the support structure 18 and independent of the robotic arms. This pressure element is pressed against the sidewall of the tyre 2 to highlight any structural defects of the sidewall ("weak side" defect check).

The first check station 8" and the second check station 9" of the second check unit 6 are identical to the first check station 8' and to the second check station 9' of the first check unit 5, whereby the description will not be repeated herein and the reference numerals used in FIGS. 1 and 2 are the same.

The overturning and transport device 7 may be structurally similar to the preliminary check station 4, as it comprises the support structure 10, the support device 11 and the pair of arms 16 movable with the grip elements 17 defining the overturning mechanism. Unlike the preliminary check station 4, the overturning and transport device 7 is not provided with the actuator 15 nor with the fixed low-definition acquisition system 12 and the movable low-definition acquisition system 13, since the function of the overturning and transport device 7 is only to overturn each tyre 2 around the overturning axis "Y-Y" before the passage to the second check unit 6.

The apparatus 1 comprises an electronic unit 28, schematically illustrated in FIG. 1, operatively connected to the preliminary check station 4, to the first and second check stations 8', 8", 9', 9" of the first and second check unit 5, 6 and to the overturning and transport device 7. The electronic unit 28 comprises a CPU, a memory, input and output devices, communication devices that allow devices and/or components of the electronic unit 28 and of the apparatus 1 to "communicate" with each other by exchanging system information or data through the transmission of signals. The electronic unit 28 is configured for managing the apparatus 1 for checking tyres.

According to a method for checking tyres according to the present invention, the tyres 2 coming one after the other from the plant 3, are fed in sequence into an inlet of the preliminary check station 4. When the plant 3 and the apparatus 1 for checking tyres are in steady state, the apparatus 1 is alternately in a first operating condition or in a second operating condition.

In the first operating condition, the preliminary check station 4, the first check stations 8', 8" and the second check stations 9', 9" of the first check unit 5 and the second check unit 6 and the overturning and transport device 7 each house a respective tyre 2. In the second operating condition, the tyres 2 move simultaneously from one station to the next, a new tyre 2 enters the preliminary check station 4 and a checked tyre 2 exits the second check station 9" of the second check unit 6. In the second operating condition, the tyres 2 advance simultaneously in pitches along the check path.

In the following description, the path of one of said tyres 2 will be described.

While the tyre 2 enters the preliminary check station 4, sensors, not shown, check the shape and dimensions of the tyre 2 itself. Once it has entered the preliminary check station 4, the tyre 2 rests with a sidewall thereof on the support device 11 of the preliminary check station 4 and a first axial half of the tyre 2, the one facing upwards, is subjected to a preliminary check through the fixed low-definition acquisition system 12 and the movable low-definition acquisition system 13.

In particular, the electronic unit 28 controls the movement devices 14, that is, the Cartesian manipulator, to bring and position the movable low-definition acquisition system 13 within the tyre 2. The electronic unit 28 controls the actuator 15 which rotates the support device 11 and the tyre 2 about its rotation axis "X-X". During a complete revolution of the tyre 2, the movable low-definition acquisition system 13 is held stationary and acquires a circumferential portion of an inner surface of the first axial half of the tyre 2 while the fixed acquisition system 12 acquires a circumferential portion of an outer surface of the first axial half of the tyre 2.

Once the two low-definition acquisitions described above have been completed, it is provided to stop the rotation of the tyre 2 and remove the movable low-definition acquisition system 13 from the tyre 2. The arms 16 of the overturning mechanism of the preliminary check station 4 grip the tyre 2, lift it, overturn it by 180° around the overturning axis "Y-Y" and reposition it on the support device 11 of said preliminary check station 4.

The electronic unit 28 controls the movement devices 14 to return and position the movable low-definition acquisition system 13 back within the tyre 2. The electronic unit 28 controls the actuator 15 which rotates the support device 11 of the preliminary check station 4 and the tyre 2 about its rotation axis "X-X". During a complete revolution of the tyre 2, the movable low-definition acquisition system 13 is held stationary and acquires a circumferential portion of an inner surface of a second axial half of the tyre 2 while the fixed acquisition system 12 acquires a circumferential portion of an outer surface of the second axial half of the tyre 2.

Once the further two low-definition acquisitions described above have been completed, it is provided to stop the rotation of the tyre 2 and remove the movable low-definition acquisition system 13 from the tyre 2.

The arms 16 of the overturning mechanism of the preliminary check station 4 grip the tyre 2, lift it, overturn it by 180° around the overturning axis "Y-Y" and reposition it back on the support device 11 of said preliminary check station 4.

The low-definition acquisitions in the preliminary check station 4 of the entire tyre 2 are performed in a cycle time (CT).

The electronic unit 28 itself, or a further electronic processor operatively connected to the electronic unit 28, operates the combination of the low-definition 3D images acquired so as to obtain and analyse three-dimensional digital images in low definition of at least each axial half of the tyre 2 to evaluate the presence of any macro-defects, for example by making a comparison with a digital reference model.

If macro-defects are found, the electronic unit 28 inhibits the subsequent high-definition checks to be executed on this tyre 2 in the subsequent first check unit 5 and second check unit 6. This tyre 2 is made to pass in pitches through the first check unit 5 and the second check unit 6 without activating the high-definition image acquisition systems.

At this point, the tyre 2 is displaced, positioned and centred by means of devices not illustrated and for example integrated in the support device 11 (such as the aforementioned motorised roller conveyor), in the first check station 8' of the first check unit 5. In particular, the tyre 2 is placed on the support device 19 of the first check station 8' with the first axial half facing upwards.

The electronic unit 28 controls the first robotic arm 21 of the first check station 8' so as to bring and position the respective first acquisition system 23 of three-dimensional (3D) high-definition images in a respective first acquisition position, for example of a circumferential portion of the inner surface of the first axial half of the tyre 2 (FIG. 3). The electronic unit 28 also controls the second robotic arm 22 of the first check station 8' so as to bring and position the respective second acquisition system 24 of three-dimensional (3D) high-definition images and the respective third acquisition system 25 of two-dimensional (2D) high-definition images in a respective first acquisition position, for example of a circumferential portion of the outer surface of the first axial half of the tyre 2 (FIG. 3).

The electronic unit 28 controls the actuator 20 of the first check station 8' which rotates the support device 19 and the tyre 2 about its rotation axis "X-X" while the first acquisition system 23, the second acquisition system 24 and the third acquisition system 25 of three-dimensional high-definition images of the first check station 8' are fixed.

While the tyre 2 rotates, the first acquisition system 23, the second acquisition system 24 and the third acquisition system 25 in high definition of the first check station 8' acquire respective high-definition views (2D and 3D) corresponding to the different circumferential portions of the first axial half of the tyre 2.

In the example illustrated in FIG. 3, the first acquisition system 23 of three-dimensional (3D) high-definition images of the first check station 8' acquires an inner shoulder surface (area of the tyre 2 located between the tread band and the respective sidewall, also known as a buttress). At the same time, the second acquisition system 24 of three-dimensional (3D) high-definition images of the first check station 8' and the third acquisition system 25 of two-dimensional (2D) high-definition images of the first check station 8' acquire an outer surface of the tread 9. This first image acquisition is carried out in a first "acquisition time" (or first slot) corresponding to the execution time of a complete rotation of the tyre 2 around its own rotation axis "X-X".

Once the first acquisition has been completed, the first robotic arm 21 of the first check station 8' brings and positions the respective first acquisition system 23 of three-dimensional (3D) high-definition images in a respective second acquisition position (FIG. 4) and the second robotic arm 22 of the first check station 8' brings and positions the respective second acquisition system 24 of three-dimensional (3D) high-definition images and the respective third acquisition system 25 of two-dimensional (2D) high-definition images in a respective second acquisition position (FIG. 4).

While the tyre 2 rotates, the first acquisition system 23, the second acquisition system 24 and the third acquisition system 25 in high definition of the first check station 8' perform a second acquisition in a second slot (which has a duration equal to first slot).

In the example illustrated in FIG. 4, the first acquisition system 23 of three-dimensional (3D) high-definition images of the first check station 8' acquires an inner surface of the sidewall. At the same time, the second acquisition system 24 of three-dimensional (3D) high-definition images and the third acquisition system 25 of two-dimensional (2D) high-definition images of the first check station 8' acquire a different outer surface of the tread 9.

FIGS. 5, 6, 7 and 8 show further positions of the first, second and third high-definition image acquisition systems 23, 24, 25 of the first check station 8' in further acquisition slots performed in the first check station 8 of the first check unit 5. Overall, the successive acquisition slots in the first check station 8' are six, during each slot, two or three high-definition views are acquired, both 2D and 3D.

Once the first six slots have been completed, the tyre 2 is displaced, positioned and centred, by means of devices not illustrated and for example integrated in the support device 19 of the first check station 8' (such as the aforementioned motorised roller conveyor), in the second check station 9' of the first check unit 5. In particular, the tyre 2 is placed on the support device 19 of the second check station 9', again with the first axial half facing upwards.

The electronic unit 28 controls the first robotic arm 21 of the second check station 9' so as to bring and position the fourth acquisition system 26 of two-dimensional (2D) high-definition images in a respective first acquisition position, for example of a circumferential portion of the outer surface of the first axial half of the tyre 2 (FIG. 9). The electronic unit 28 also controls the second robotic arm 22 of the second check station 9' so as to bring and position the fifth acquisition system 27 of two-dimensional (2D) high-definition images in a respective first acquisition position, for example of a circumferential portion of the inner surface of the first axial half of the tyre 2 (FIG. 9). While the tyre 2 rotates, the fourth acquisition system 26 and the fifth acquisition system 27 of the second check station 9' acquire respective high-definition views (2D) corresponding to the different circumferential portions of the first axial half of the tyre 2.

In the example illustrated in FIG. 9, the fourth acquisition system 26 of two-dimensional (2D) high-definition images acquires an outer surface of the sidewall. At the same time, the fifth acquisition system 27 of two-dimensional (2D) high-definition images acquires an inner shoulder surface.

FIGS. 10-14 show further positions of the fourth and fifth acquisition systems 26, 27 in further acquisition slots executed in the second check station 9' of the first check unit 5. Overall, the successive acquisition slots in the second check station 9' are six, during each slot, two high-definition 2D views are acquired.

In slots one and two, the fifth acquisition system 27 (2D) executes the acquisition while the sidewall is mechanically compressed by means of a tool, for example a roller 29, to better highlight any notches in the tyre 2 itself.

The electronic unit 28, or the further electronic processor operatively connected to the electronic unit 28, operates the combination of the high-definition 3D images all acquired in the first check station 8' of the first check unit 5 and in a single cycle time (CT) and generates a first axial half of a complete high-definition three-dimensional image of the surface of the tyre 2.

The electronic unit 28 also operates the combination of the high-definition 2D images acquired partly in the first check station 8' and partly in the second check station 9' of the first check unit 5 and generates a first axial half of a complete two-dimensional image of the surface of the tyre 2.

The high-definition acquisitions of the first axial half of the tyre 2 in the first check unit 5 are performed in a time corresponding to twice the cycle time (CT), i.e. in the cycle time multiplied by the two check stations (first and second check station 8', 9') of the first check unit 5.

Once the second six slots have been completed, the tyre 2 is displaced and positioned, by means of devices not illustrated and for example integrated in the support device 19 of the second check station 9' (such as the previously mentioned motorised roller conveyor), in the overturning and transport device 7.

In particular, the tyre 2 is moved on the support device 11 of the overturning and transport device 7. The overturning and transport device 7 provides, by means of its movable arms 16, for gripping, lifting and overturning the tyre 2 by 180° and place it again on its support device 11 with a second axial half of the tyre 2 facing upwards.

The tyre 2 is then displaced, positioned and centred by means of devices not shown and for example integrated in the support device 11 of the overturning and transport device 7 (such as a motorised roller conveyor), in the first check station 8" of the second check unit 6.

In the second check unit 6, the second axial half of the tyre 2 is subjected to the same checks carried out on the first half of the tyre 2 in the first check unit 5 and in the same manner. The sequence described and illustrated in FIGS. 3 to 14 therefore applies to the second check unit 6 and will not be described herein again.

Similar to what done for the first axial half, the electronic unit 28 operates the combination of the high-definition 3D images all acquired in the first check station 8" of the second check unit 6 and in a single cycle time (CT) and generates a second axial half of a complete high-definition three-dimensional image of the surface of the tyre 2, and also operates the combination of high-definition 2D images acquired partly in the first check station 8" and partly in the second check station 9" of the second check unit 6 and generates a second axial half of a complete two-dimensional image of the surface of the tyre 2.

The high-definition acquisitions of the second axial half of the tyre 2 in the second check unit 6 are performed in a time corresponding to twice the cycle time (CT), i.e. in the cycle time multiplied by the two check stations (first and second check station 8", 9") of the second check unit 6. The high-definition acquisitions of the whole tyre 2 are therefore performed in a time corresponding to four times the cycle time (CT).

Such high-definition 3D and 2D images are then, for example, analysed and/or compared with digital reference models in order to trace defects and/or non-conformities.

Once the check has been completed, the tyre 2 is extracted from the second check station 9" of the second check unit 6 and is sent to storage and/or further checks or, if it is not considered compliant, is discarded and sent to a manual check that checks and classifies all the defects thereof.

Figure 15:
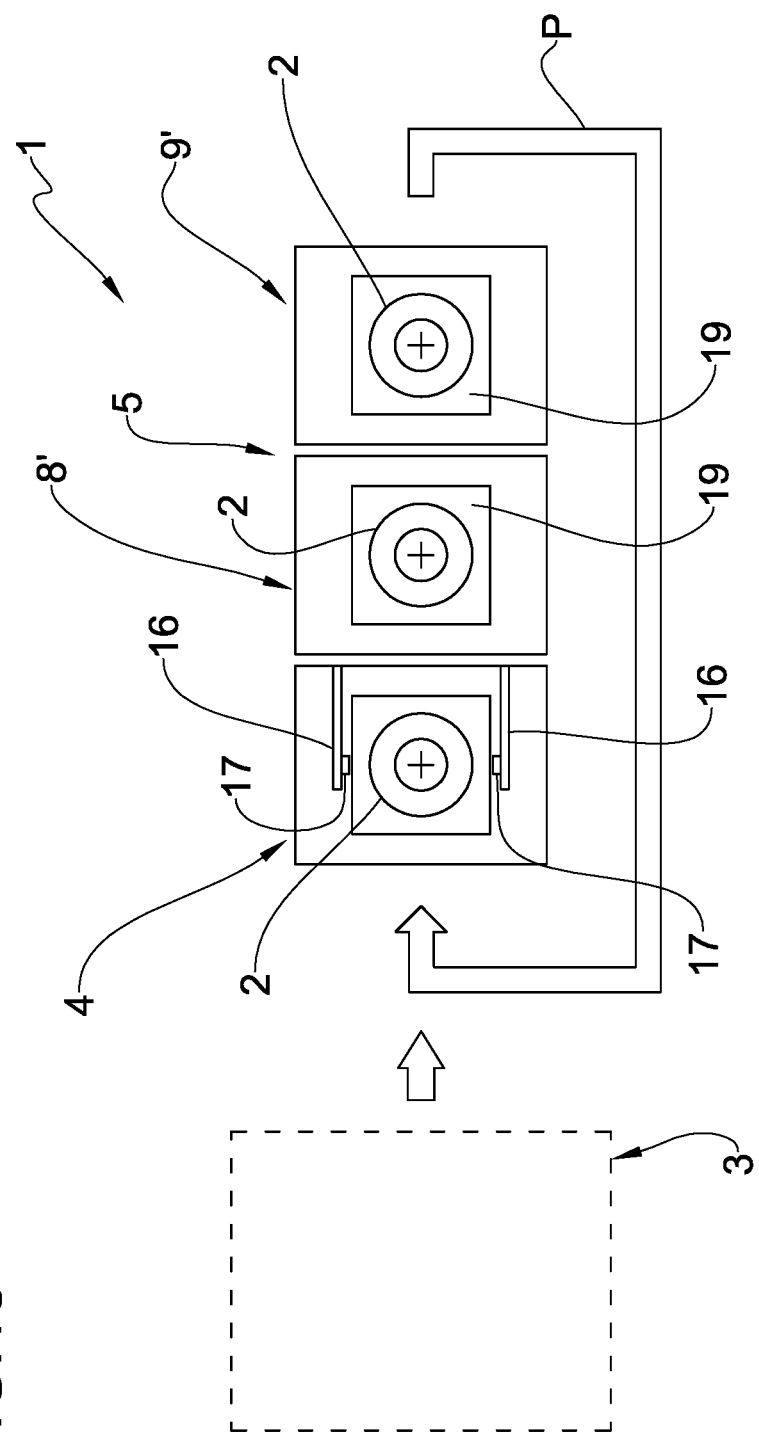
FIG. 15 shows a plan view of a variant of the apparatus for checking tyres as shown in FIGS. 1 and 2.

In an embodiment variant of the apparatus 1 illustrated in FIG. 15, the check unit is single and is identical to the first check unit 5 (or to the second check unit 6) described above. The first check path and the second check path physically coincide.

In this embodiment, the overturning and transport device coincides with the preliminary check station 4.

After a first transition of each tyre 2 through the preliminary check station 4, the first check station 8' and the second check station 9' of the first and only check unit 5, devices, not shown, are configured for bringing the tyre 2 from an outlet of the second check station 9' back again to the inlet of the preliminary check station 4 along a path "P".

In the preliminary check station 4, in its second transition, the tyre 2 is only overturned by 180° and is not subjected again to the preliminary checks. Therefore, after the acquisition of the high-definition images of the first axial half, the tyre 2 travels over the same check path for the acquisition of the high-definition images of the second axial half.

The invention claimed is:

1. A method for checking tyres, each tyre having an axial middle line plane defining respective axial halves of said tyre, the method comprising:
   simultaneously advancing, by pitches, the tyres along a check path and acquiring high-definition images of a surface of every tyre in a time corresponding to at least two times a cycle time, between successive pitches and in respective at least two check stations,
   wherein acquiring high-definition images comprises:
      acquiring high-definition three-dimensional images and high-definition two-dimensional images of the surface of the tyre, and
      combining together at least the high-definition three-dimensional images acquired in order to obtain at least one axial half of a complete three-dimensional image of said surface of the tyre,
   wherein the high-definition three-dimensional images are acquired during a single cycle time in a single check station.

2. The method as claimed in claim 1, comprising:
acquiring low-definition images of the surface of every tyre in a single preliminary check station and prior to acquiring the high-definition images.

3. The method as claimed in claim 2, wherein the low-definition images are acquired during a single cycle time.

4. The method as claimed in claim 1, wherein
high-definition images of a first axial half of the tyre are acquired in a first check path and subsequently high-definition images of a second axial half of the tyre are acquired in a second check path,
the high-definition three-dimensional images of the first axial half are acquired during a single cycle time in a single check station of the first check path, and
the high-definition three-dimensional images of the second axial half are acquired during a single cycle time in a single check station of the second check path.

5. The method as claimed in claim 4, wherein
the first check path and the second check path physically coincide, and
after acquisition of the high-definition images of the first axial half, the tyre again travels the same check path for the acquisition of the high-definition images of the second axial half.

6. The method as claimed in claim 4, wherein between the acquisition of the high-definition images of the first axial half and the acquisition of the high-definition images of the second axial half, the tyre is overturned by 180°.

7. The method as claimed in claim 6, comprising acquiring the low-definition images of both axial halves of each tyre in the single preliminary check station.

8. The method as claimed in claim 7, comprising, in the single preliminary check station:
acquiring the low-definition images of the first axial half,
overturning the tyre by 180°, and
acquiring the low-definition images of the second axial half.

9. The method as claimed in claim 1, wherein, in each cycle time and in each check station, acquiring high-definition images comprises:
executing successive acquisitions,
wherein during each acquisition, multiple high-definition views corresponding to different portions of the tyre are simultaneously acquired.

10. The method as claimed in claim 9, wherein in the single cycle time and in the check station dedicated to the acquisition of the high-definition three-dimensional images, four to eight successive acquisitions are performed.

11. The method as claimed in claim 9, wherein during each acquisition, two to four high-definition views are acquired.

12. The method as claimed in claim 10, wherein during each acquisition, two or three high-definition three-dimensional views are acquired.

13. An apparatus for checking tyres, each tyre having an axial middle line plane defining respective axial halves of said tyre; the apparatus comprising:
at least one check unit comprising at least two check stations placed consecutively and defining a check path configured such that each check station is traversed in one cycle time and by pitches by each tyre to be checked,
each of the at least two check stations comprising
a support device for supporting one tyre at a time housed in the respective check station,
a plurality of high-definition image acquisition systems for the acquisition of high-definition images of a surface of the tyre, and
movement devices for moving the high-definition image acquisition systems within the respective check station,
wherein
the plurality of high-definition image acquisition systems comprises systems for acquiring high-definition three-dimensional images and systems for acquiring high-definition two-dimensional images, and
only one of said at least two check stations comprises all the high-definition three-dimensional image acquisition systems of the check unit.

14. The apparatus as claimed in claim 13, comprising a preliminary check station situated upstream of said at least one check unit and comprising:
a support device for supporting one tyre at a time housed in the preliminary check station,
a plurality of low-definition image acquisition systems for acquisition of low-definition images of a surface of the tyre, and
movement devices for moving the low-definition image acquisition systems within the respective preliminary check station.

15. The apparatus as claimed in claim 13, comprising:
a single check unit and an overturning and transport device operatively interposed between an output of said single check unit and an input of said single check unit, said overturning and transport device being configured for overturning the tyre around an overturning axis,
wherein the plurality of high-definition image acquisition systems of the single check unit are configured for executing checks on one of the axial halves of the tyre and for executing checks on the other of the axial halves of the tyre once said tyre has been overturned by the overturning and transport device.

16. The apparatus as claimed in claim 13, comprising:
a first check unit and a second check unit operatively arranged one after the other; and
an overturning and transport device operatively interposed between the first check unit and the second check unit, said overturning and transport device being configured for overturning the tyre around an overturning axis,
wherein the plurality of high-definition image acquisition systems of the first check unit are configured for executing checks on a first axial half of the tyre and the plurality of high-definition image acquisition systems of the second check unit are configured for executing checks on a second axial half of the tyre once said tyre has been overturned by the overturning and transport device.

17. The apparatus as claimed in claim 14, wherein the preliminary check station comprises an overturning mechanism configured for overturning the tyre around an overturning axis and for allowing the acquisition of the low-definition images of the first axial half and of the second axial half.

18. The apparatus as claimed in claim 13, wherein the support device of the check stations comprises an actuator configured for rotating the tyre around the rotation axis thereof during the acquisition of the high-definition images of the surface of the tyre.

19. The apparatus as claimed in claim 18, comprising an electronic unit operatively connected to the check stations and configured for executing the steps of:

positioning the high-definition image acquisition systems by means of the movement devices;
rotating the tyre housed in each check station by the actuator;
simultaneously acquiring multiple high-definition views corresponding to different portions of the tyre by the high-definition image acquisition systems and while the tyre rotates;
repositioning the high-definition image acquisition systems; and
simultaneously acquiring further high-definition views corresponding to different portions of the tyre while the tyre rotates.

20. The apparatus as claimed in claim 19, wherein the electronic unit is configured for combining together at least the high-definition three-dimensional images acquired in only one of said at least two check stations to obtain at least one axial half of a complete three-dimensional image of said surface of the tyre.

21. The apparatus as claimed in claim 17, wherein the support device of the preliminary check station comprises an actuator configured for rotating the tyre around the rotation axis thereof during the acquisition of the low-definition images of the surface of the tyre.

22. The apparatus as claimed in claim 21, comprising an electronic unit operatively connected to the preliminary check station and configured for executing the steps of:
positioning the low-definition image acquisition systems by the movement devices;
rotating the tyre housed in the preliminary check station by the actuator; and
simultaneously acquiring multiple low-definition views corresponding to different portions of a first axial half of the tyre by the low-definition image acquisition systems and while the tyre rotates,
stopping the rotation of the tyre,
overturning the tyre by the overturning mechanism, and
repositioning the low-definition image acquisition systems;
rotating the tyre again;
simultaneously acquiring multiple low-definition views corresponding to different portions of a second axial half of the tyre by the low-definition image acquisition systems and while the tyre rotates; and
combining the low-definition views to obtain a low-definition image of said at least first axial half and of said at least second axial half of the tyre.

\* \* \* \* \*